J. TRAGESER.

METHOD OF CONNECTING SPUTS TO BOILERS.

No. 10,022. Reissued Jan. 31, 1882.

WITNESSES:

Francis McArdle.

C. Sedgwick

INVENTOR:

J. Trageser

BY Munn & Co

ATTORNEYS.

UNITED STATES PATENT OFFICE.

JOHN TRAGESER, OF NEW YORK, N. Y.

METHOD OF CONNECTING SPUTS TO BOILERS.

SPECIFICATION forming part of Reissued Letters Patent No. 10,022, dated January 31, 1882.

Original No. 210,476, dated December 3, 1878. Application for reissue filed December 24, 1881.

*To all whom it may concern:*

Be it known that I, JOHN TRAGESER, of the city, county, and State of New York, have invented a new and useful Improvement in Methods of Connecting Sputs to Boilers, of which the following is a full, clear, and exact description.

Pipes from water-boilers are usually coupled to screw-rings or sputs which are attached to the boiler-head. Such sputs have been attached by riveting them to the boiler; but they are apt to get loose and leak at the joint.

The object of my invention is to connect the sputs firmly and reliably, so that the joint will be perfectly water-tight.

The invention consists in a method of connection by calking the metal of the boiler against the sput, as hereinafter described and claimed.

Reference is to be had to the accompanying drawings, forming part of this specification, in which similar letters of reference indicate corresponding parts in both the figures.

Figure 1:
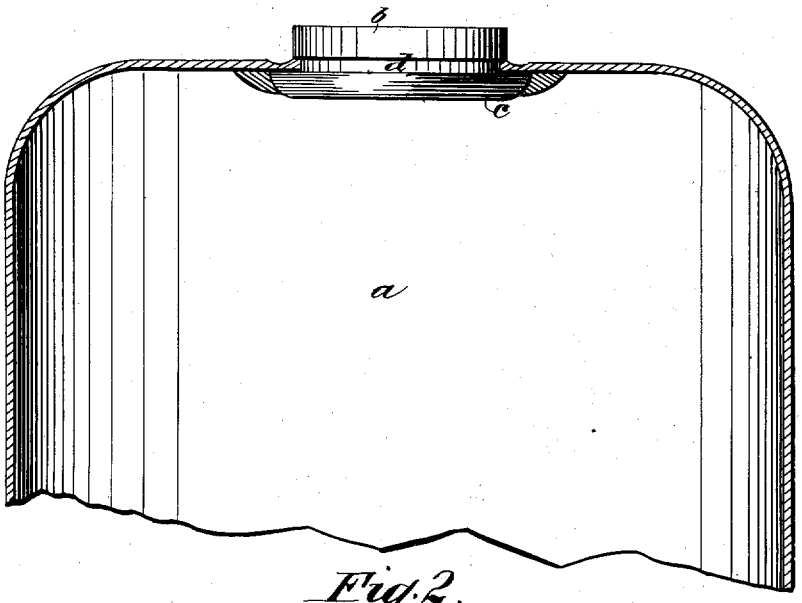
Figure 2:
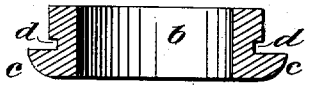

Figure 1 is a section of a boiler-head with a sput attached in accordance with my invention. Fig. 2 is a section of the sput detached.

*a* is a boiler of any usual or desired construction, such as is used in connection with water-backs, and *b* is the sput attached to the same. The sput *b* is in the form of a ring that passes through an opening in boiler *a*, and it has a flange or head, *c*, that takes against the inner surface of the boiler.

Upon the exterior of the ring or sput *b*, next to flange *c*, is an annular cavity or recess, *d*, which, when the sput is inserted in the opening formed in the boiler, is in the same plane with the edge of the opening. The sput is attached by calking or working the metal of the boiler at the edge of the opening against and into the surface of the sput, after which the joint is brazed to make the connection perfectly water-tight.

By this manner of connecting the sput to the boiler I am enabled to make a perfectly tight and firm joint which will not leak. The projecting end of the sput will be cut with a thread, as usual, for coupling the pipes.

Having thus fully described my invention, I claim as new and desire to secure by Letters Patent—

1. The method of connecting sputs to boilers, consisting in calking the metal of the boiler against the surface of the sput and brazing the joint, substantially as shown and described.

2. The method of connecting sputs to boilers, consisting in forming a recess around the body of the sput, into which recess the metal of the boiler is worked and the joint brazed, substantially as shown and described.

JOHN TRAGESER.

Witnesses:
GEO. D. WALKER,
C. SEDGWICK.